United States Patent
Park et al.

(10) Patent No.: US 7,277,548 B2
(45) Date of Patent: Oct. 2, 2007

(54) CRYPTOGRAPHIC METHOD AND COMPUTER PROGRAM PRODUCT FOR USE IN WIRELESS LOCAL AREA NETWORKS

(75) Inventors: Young Ho Park, Verona, NJ (US); Kwang-Bock You, Pine Brook, NJ (US); Jung Gil Shin, Glen Rock, NJ (US)

(73) Assignee: nDosa Technologies, Inc., Fairfield, NJ (US)

( * ) Notice: Subject to any disclaimer, the term of this patent is extended or adjusted under 35 U.S.C. 154(b) by 793 days.

(21) Appl. No.: 10/617,642

(22) Filed: Jul. 11, 2003

(65) Prior Publication Data

US 2004/0083362 A1    Apr. 29, 2004

Related U.S. Application Data

(60) Provisional application No. 60/421,123, filed on Oct. 23, 2002.

(51) Int. Cl.
*H04L 9/00*    (2006.01)
(52) U.S. Cl. ............... 380/270; 380/42; 380/44; 380/273; 380/274
(58) Field of Classification Search .......... None
See application file for complete search history.

(56) References Cited

U.S. PATENT DOCUMENTS

| | | | |
|---|---|---|---|
| 5,144,664 A | 9/1992 | Esserman et al. | |
| 5,327,365 A | 7/1994 | Fujisaki et al. | |
| 5,420,928 A | 5/1995 | Aiello et al. | |
| 5,473,693 A | 12/1995 | Sprunk | |
| 5,515,307 A | 5/1996 | Aiello et al. | |
| 6,108,583 A | 8/2000 | Schneck et al. | |
| 6,118,869 A * | 9/2000 | Kelem et al. | 380/44 |
| 6,931,132 B2 * | 8/2005 | Billhartz et al. | 380/280 |
| 2006/0078124 A1 * | 4/2006 | Whelan et al. | 380/273 |

OTHER PUBLICATIONS

"ANSI/IEEE Std 802.11—Part 11: Wireless LAN Medium Access Control (MAC) and Physical Layer (PHY) Specifications", IEEE, 1999, Retrieved from the Internet on Nov. 4, 2006: <URL: http://grouper.ieee.org/groups/802/11/>.*

Housley et al., "Alternate Temporal Key Hash", IEEE, Apr. 2002, Retrieved from the Internet on Nov. 4, 2006: <URL: http://grouper.ieee.org/groups/802/11/>.*

Walker, J., "Unsafe at any key size; An analysis of the WEP encapsulation", IEEE, Oct. 2000, Retrieved from the Internet on Nov. 4, 2006: <URL: http://grouper.ieee.org/groups/802/11/>.*

(Continued)

*Primary Examiner*—Gilberto Barron
*Assistant Examiner*—Minh Dinh
(74) *Attorney, Agent, or Firm*—Alston & Bird LLP

(57) ABSTRACT

An encryption system and method that may encrypt all of the transmitted and received data packets on the data link layer without collisions on the Initialization Vector (IV). In the encryption system and method a new final key value may be generated and applied to every transmitted and received data packet. The encryption system and method provide for a novel three phase algorithmic process for generating a final secret key.

23 Claims, 6 Drawing Sheets

OTHER PUBLICATIONS

Housley et al., "Temporal Key Hash", IEEE, Dec. 2001, Retrieved from the Internet on Apr. 23, 2007: URL: <http://grouper.ieee.org/groups/802/11/Documents/D1T501-550.html>.*

F-Secure Corporation; *Protecting Wireless LANs*; White Paper; Apr. 2002; 7 pages; F-Secure, Inc, F-Secure Corporation; San Jose, CA and Espoo, Finland.

B.P. Crow, I. Widjaja, J.G.Kim, P.Sakai; *Investigation of the IEEE 802.11 Medium Access Control (MAC) Sublayer Functions*; 1997, 8 pages; IEEE; 0-8166-7780-5/97.

U.S. Department of Commerce/National Institute of Standards and Technology; *Data Encryption Standards (DES)*; 1999; FIPS PUB 46-3; Federal Information Processing Standards Publication, Category: Computer Security, Subcategory: Cryptography; 22 pages.

* cited by examiner

CRYPTOGRAPHIC METHOD AND COMPUTER PROGRAM PRODUCT FOR USE IN WIRELESS LOCAL AREA NETWORKS

CROSS-REFERENCE TO RELATED APPLICATIONS

This application claims the benefit of U.S. Provisional Application No. 60/421,123, filed Oct. 23, 2002, which is hereby incorporated herein in its entirety by reference.

FIELD OF THE INVENTION

The present invention relates to security in communication networks and, more particularly to an encryption system that benefits from the dynamic nature of the key and a key scheduling algorithm that may change for every data packet requiring encryption.

BACKGROUND OF THE INVENTION

Encryption, or information scrambling, technology is an important security tool in network communication. Properly applied, encryption can provide a secure communication channel even when the underlying system and network infrastructure is not fail-safe secure. This is particularly important when data passes through shared systems or network segments where multiple people may have access to the information. In these situations, sensitive data—and especially passwords—should be encrypted in order to protect them from unintended disclosure or modification.

Encryption is a procedure that involves a mathematical transformation of information into scrambled text, called "cipher text." The computational process (an algorithm) uses a key—a large number associated with a password or pass phrase—to compute or convert plain text into cipher text with numbers or strings of characters. The resulting encrypted text is decipherable only by the holder of the corresponding key. This deciphering process is called decryption.

Two basic types of encryption in use today are known as private key (also referred to as single or symmetrical key) encryption and public key (or asymmetrical) encryption.

In private key encryption systems, the key for encrypting a file is the same as the key for decrypting it. The key must be kept secret so that unauthorized parties cannot, even with knowledge of the algorithm, complete the decryption process. Private key encryption is essentially the same as a secret code that each of the hosts must know in order to decode information. The code provides the key to decoding the message. A private key system is generally advantageous for a relatively small group of encryptors because the task of key management, including key changes, is easily administered.

Private key encryption is used in standard algorithms such as Data Encryption Standard algorithm (DES), which was introduced, in the early 1970's. The DES algorithm uses a 56-bit key to encrypt and decrypt information. DES splits each message into blocks (i.e., hashs) and then encodes each block one at time. At its inception DES was adopted as an approved algorithm for United States federal government use, but it is no longer considered adequately secure because a 56-bit key can be broken by brute force in a relatively short period of time. DES has since been superceded by the Advanced Encryption Standard (AES), using the Rijndel algorithm. AES operates with 128, 192 or 256 bit keys.

In public key cryptography systems, each user has a pair of keys: one private and one public. The public key is not secret—it is provided to all users who may want to send an encrypted message to the key's owner. The sender uses the recipient's public key to encrypt the message and "signs" it electronically with the sender's own private key (which resides on the sender's host and is held private). The recipient then decrypts the incoming message using its private key and verifies the authenticity of the sender's electronic signature using the sender's public key.

An example of a common public-key encryption tool that is utilized on the Internet is Pretty Good Privacy (PGP). PGP is a highly secure public key encryption program that is compatible with Microsoft Exchange/Outlook and Eudora email clients. Another example of a public key system is GnuPG, which is a free (open source) command-line product that is compatible with PGP public and private keys. Additionally, email clients such as Microsoft Outlook Express and Netscape Communicator offer a form of public key encryption based on the secure MIMI standard. Typically, the email client encryptors are weaker forms of encryption having a less ubiquitous standard and require trust be placed in a central commercial certifying authority.

Encryption is useful for messages transmitted via a variety of network architectures including Wireless Local Area Networks (WLANs). WLANs are becoming more popular in corporate networks where the mobility of laptops and ad-hoc network connections are essential. Without adequate protection, wireless LAN traffic can easily be intercepted. Security in the data link layer is crucial since data is transmitted through a wireless medium between Network Interface Cards (NICs) and Access Points (APs). Currently, wireless LAN uses the stream encryption algorithm based on the static key, known as Wired Equivalent Privacy (WEP). The WEP algorithm is the standard encryption algorithm in IEEE 802.11, 802.11a, and 802.11b. WEP is implemented in the MAC layer that most NICs and Access Point vendors support. It was chosen as the standard because it was deemed reasonably strong, self-synchronizing, and computationally sufficient If a user activates WEP, the NIC encrypts the payload of each 802.11 frame before transmission using an RC4 PRNG (Pseudo Random Number Generator) stream cipher provided by RSA Data Security of Bedford, Mass. The receiving entity, such as an Access Point or another NIC, performs decryption upon receipt of the frame. As a result, 802.11 WEP only encrypts data between 802.11 stations. Once the data enters the wired side of the network, such as between two Access Points, WEP no longer applies.

The WEP algorithm is a form of electronic codebook in which a block of plaintext is bitwise XORed with a pseudorandom key sequence of equal length. The key sequence is generated by the WEP algorithm. The WEP algorithm is symmetric so that the same key is used for encipherment and decipherment. As part of the encryption process, WEP prepares a keyschedule ("seed") by concatenating the shared secret key supplied by the user of the sending host with a random-generated 24-bit initialization vector (IV). The IV lengthens the life of the secret key because the host can change the IV for each frame transmission while the secret key remains constant. WEP inputs the resulting "seed" into a PRNG.

The PRNG produces a key sequence, k, of pseudorandom octets equal in length to the frame's payload plus a 32-bit integrity check value (ICV). The ICV is a check sum that the receiving host eventually recalculates and compares to the one sent by the sending host to determine whether the transmitted data underwent any form of tampering while in transit. If the receiving station calculates an ICV that doesn't match the one found in the frame, then the receiving station can reject the frame or flag the user.

In effect, the WEP PRNG transforms a relatively short secret key into an arbitrarily long key sequence. This transformation greatly simplifies the task of key distribution between communicating hosts. As previously noted, the IV extends the useful lifetime of the secret key and, additionally, provides the self-synchronous property of the algorithm. Each new IV value results in a new seed and key sequence, thus there is a one to one correlation between the IV and key sequence, k.

WEP specifies a shared secret 40 or 104-bit key to encrypt and decrypt the data. Some vendors also include 128 bit keys (known as "WEP2") in their products. With WEP, the receiving host must use the same key for decryption. Each NIC and Access Point, therefore, must be manually configured with the same key.

Before transmission takes place, WEP combines the key sequence with the payload/ICV through a bitwise XOR process, which produces ciphertext (encrypted data). WEP includes the IV in the clear (unencrypted) within the first few bytes of the frame body. The receiving station uses this IV along with the shared secret key supplied by the user of the sending station to decrypt the payload portion of the frame body.

Although not required by the 802.11 standard, the sending station will use a different IV for each frame in most cases. When transmitting messages having a common beginning, such as the "FROM" address in an e-mail, the beginning of each encrypted payload will be equivalent when using the same key. After encrypting the data with the same key, the beginnings of these frames would offer a pattern that can aid hackers in cracking the encryption algorithm. Since the IV is different for most frames, WEP guards against this type of attack. The frequent changing of IVs also improves the ability of WEP to safeguard against someone compromising the data.

However, WEP is not without serious limitations due to lack of IV space, the static nature the key and the simplicity of the key-scheduling algorithm.

First, the seed to the PRNG is formed from a simple merge of the shared secret key and the IV value in order to create either the 64-bit or 128-bit RC4Key. The only portion of the RC4Key that varies is the IV and since the IV consists of only 24 bits, WEP eventually uses the same IV for different data packets. In fact, the same RC4Key is repeated after transmitting packets once every $2^{24}$ times. For a large busy network, this reoccurrence of IVs can happen within an hour or so. This results in the transmission of frames having key sequences that are undesirably similar. If a hacker collects enough frames based on the same IV, the individual can determine the shared values among them, i.e., the key sequence or the shared secret key. This scenario is commonly referred to as IV collision and occurs due to the lack of IV space.

The static nature of the shared secret keys emphasizes the IV collision problem. The 802.11 standard does not provide any functions that support the exchange of keys among stations. As a result, system administrators and users generally use the same keys for weeks, months, and even years. This gives potential hackers plenty of time to monitor and hack into WEP-enabled networks.

Secondly, WEP provides an initial IV value that is prone to simple decryption of the shared secret key. In most systems, the initial IV value assigned to a data packet is zero and subsequent data packets are incremented by one. Therefore, a strong cross correlation between the RC4key that has an IV value of zero and the RC4Key that has an arbitrary IV value is expected. Hence, it becomes easier to decrypt the shared secret key.

Thirdly, WEP provides for an error check process known as CRC-32 (Cyclic Redundancy Code-32) to be performed on the payload portion of the MAC Protocol Data Unit (MPDU) before the WEP encryption procedure. Since CRC checks and corrects the errors by using a linear check sum, the linear check sum can remain correct as arbitrary data bits are altered so long as corresponding bits of the linear check sum are similarly altered. Therefore if an attacker intercepts a packet in transit and alters its contents before delivering it to the destination system, the information or data contained within the packet can be easily destroyed or changed without raising any suspicion.

As described above, WEP has a number of limitations. Moreover, additional limitations of the WEP algorithm include a decrease in transmission rate due to the necessary redundancy built into the algorithm.

Hence, a new encryption algorithm is desired that provides for a heightened level of security beyond the level found in the WEP algorithm. The new algorithm should address WEP's concerns related to IV collision and, in particular, the static nature of the key. Additionally, the new algorithm should overcome WEP's limitation in terms of initial IV values and ease of illegal decryption of the shared secret key. The new encryption algorithm should also address the limitations of the error check process that typify the WEP algorithm.

SUMMARY OF THE INVENTION

This invention provides for a novel encryption system and method that may encrypt all of the transmitted and received data packets on the data link layer without collisions on the Initialization Vector (IV). In the encryption system and method of the present invention a new final key value is generated and may be applied to every transmitted and received data packet. The encryption system and method of one advantageous embodiment entails a three phase algorithmic process for generating a final key.

In addition the encryption system and method of the present invention provide for the same level of encryption if it is either included within a Medium Access Control (MAC) processor or implemented as an independent module. The system and method can increase overall encryption efficiency by utilizing a pre-existing encryption system, such as Wired Equivalent Privacy (WEP) encryption, without the need to alter the data packet header. Additionally, the system can be used in both wired LANs and in wireless LANs due to its flexibility in the data packet switch networks.

In one aspect of the invention a method for generating a key for data encryption in a communication network is defined by the steps of selecting a first secret key; combining the first secret key with at least a portion of a user-specific MAC address to result in an intermediate value, combining the intermediate value with predefined key change information, typically derived from the MAC data packet. The resulting value may be transformed, such as by exploitation of a hash table to result in the key, also referred to as the first temporary key. The first secret key will typically be chosen from one of the predefined secret keys, such as those defined in accordance to wireless communication standards, such as IEEE 802.11. Combining the first secret key with a user-specific MAC address and combining the resulting intermediate value with predefined key change information will typically involve performing a bitwise exclusive OR (XOR) operation.

Another aspect of the present invention is defined by a method for generating a key for data encryption in a communication network that includes the steps of generating an Initialization Vector (IV) value, combining a first secret key with the IV value to result in an intermediate value and thereafter permutating the intermediate value. The first secret key may be generated as described above by combining a predefined secret key with a user-specific MAC address to result in an intermediate value, combining this intermediate value with predefined key change information and thereafter transforming the combination of the intermediate value and the predefined key change information, such as by hashing.

In addition the process of generating an IV value may include the steps of concatenating a timer value and at least a portion of the MAC address of the transmitting device to result in a seed value and applying the seed value to a random number generator to result in the IV value. The step of combining the first secret key with the IV value may further involve performing a bitwise XOR operation.

In another aspect of the present invention a method for generating a key for data encryption in a communications network is defined by the steps of calculating a first secret key utilizing predefined key change information, determining if the key change information has repeated and differently processing the first secret key to generate the key for data encryption in instances in which the key change information has repeated than in instances in which the key change information has not repeated. For example, the first secret key may undergo a bitwise shift in instances in which the key change information has not repeated. The step of calculating a first secret key may be performed as described above and, as such, may involve the steps of selecting a predefined secret key, combining the predefined secret key with a user-specific MAC address to result in a first intermediate value, combining the first intermediate value with predefined key change information, transforming the combination of the first intermediate value and the predefined key change information, such as by hashing, to generate a temporary key, combining the temporary key and an IV value and permutating the combination of the temporary key and the IV value to result in the first secret key.

By combining the various aspects of the encryption process, a method is provided according to one embodiment of the present invention which includes the steps of selecting a first secret key, generating a first temporary key based upon a combination of the first secret key with at least a portion of the user-specific MAC address and further based upon predefined key change information followed by hashing. A second temporary key is then generated based upon a combination of the first temporary key and an IV value. After determining if the predefined key change information has been repeated, the key for data encryption may be generated based upon the second temporary key and the determination of whether the predefined key change information has repeated.

According to the various aspects of the present invention, data may be encrypted with the key prior to being transmitted via the network, such as across a WLAN. Additionally, other embodiments of the present invention provide a computer program product readable by a machine and embodying a program of instructions for performing the various aspects of the method set forth above.

In an exemplary embodiment, if it is determined that the data is originally encrypted in accordance with a predetermined encryption technique, the data may be decrypted prior to encrypting the data transmitted via the communication network with the final key.

BRIEF DESCRIPTION OF THE DRAWINGS

Figure 1:
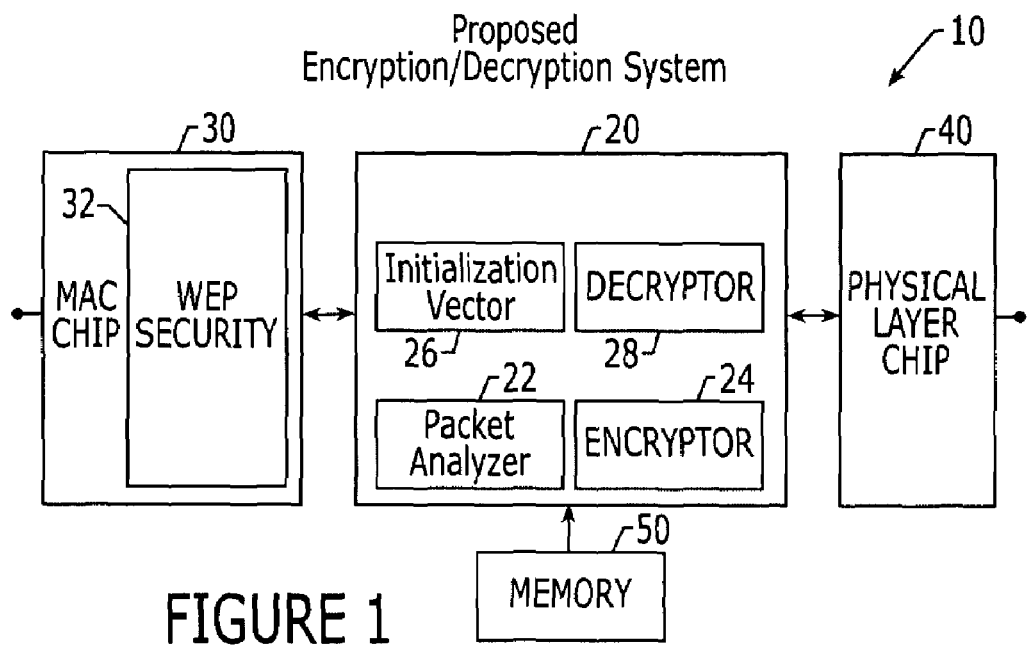

Having thus described the invention in general terms, reference will now be made to the accompanying drawings, which are not necessarily drawn to scale, and wherein:

FIG. 1 is a block diagram of the overall encryption/decryption system architecture, in accordance with an embodiment of the present invention.

Figure 2:
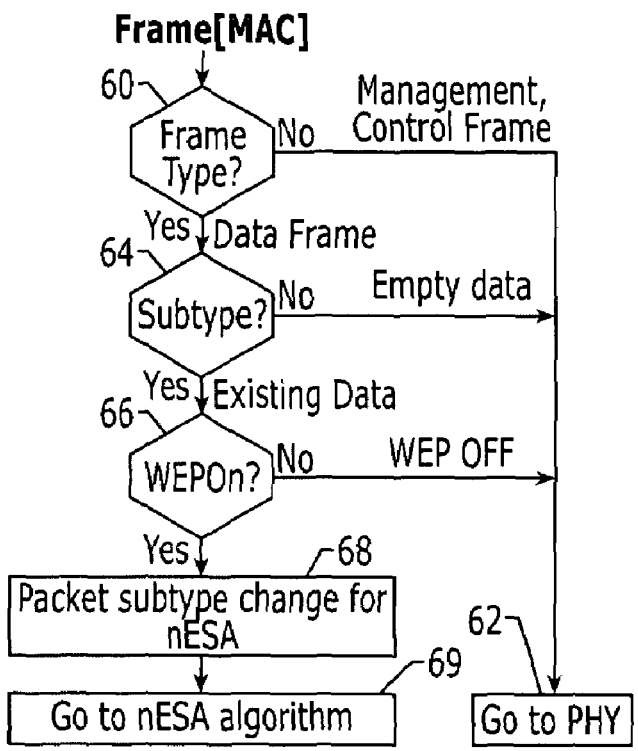

FIG. 2 is flow diagram of the data packet analysis algorithm of the encryption system that serves to select for encryption packets transmitted from the MAC sublayer, in accordance with an embodiment of the present invention.

Figure 3:
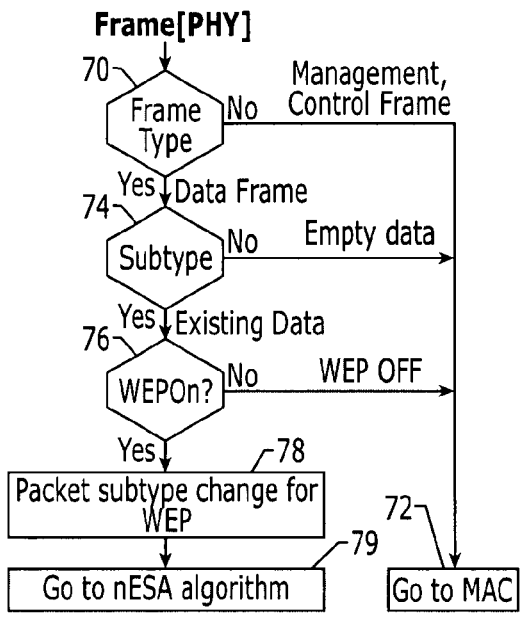

FIG. 3 is a flow diagram of the data packet analysis algorithm of the decryption system that serves to select for encryption packets transmitted from the physical layer, in accordance with an embodiment of the present invention.

Figure 4:
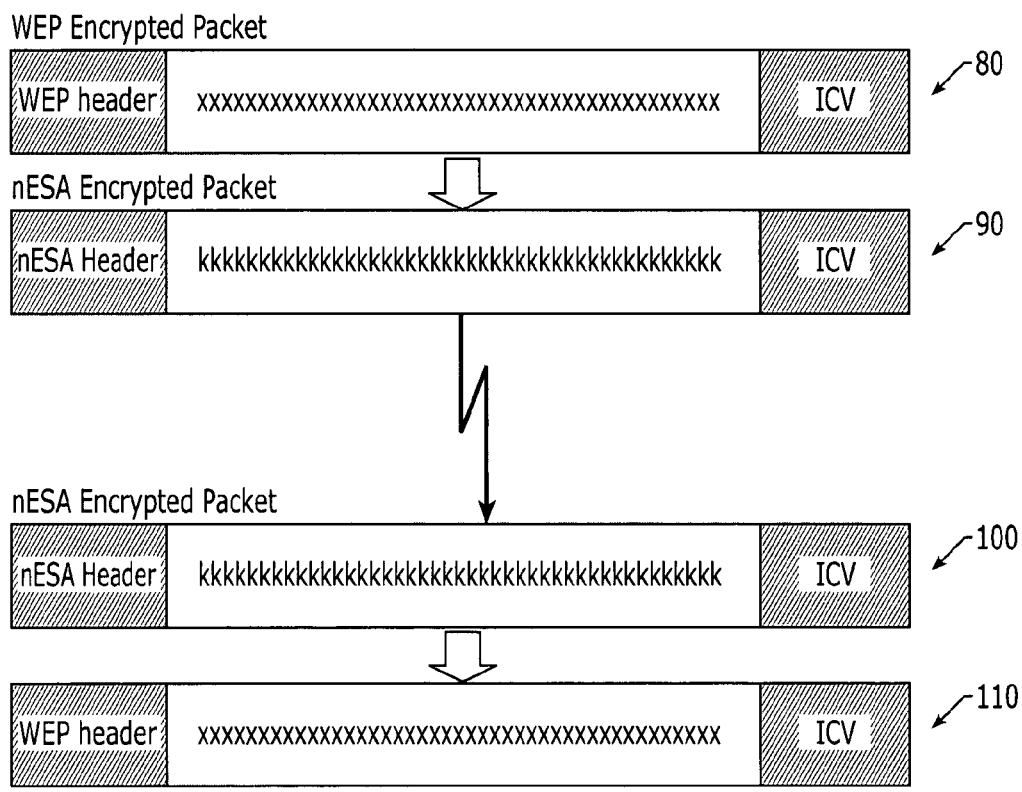

FIG. 4 is a flow diagram of the process for converting between WEP encryption and the encryption algorithm of the present invention prior to and following transmission of a packet, in accordance with an embodiment of the present invention.

Figure 5:
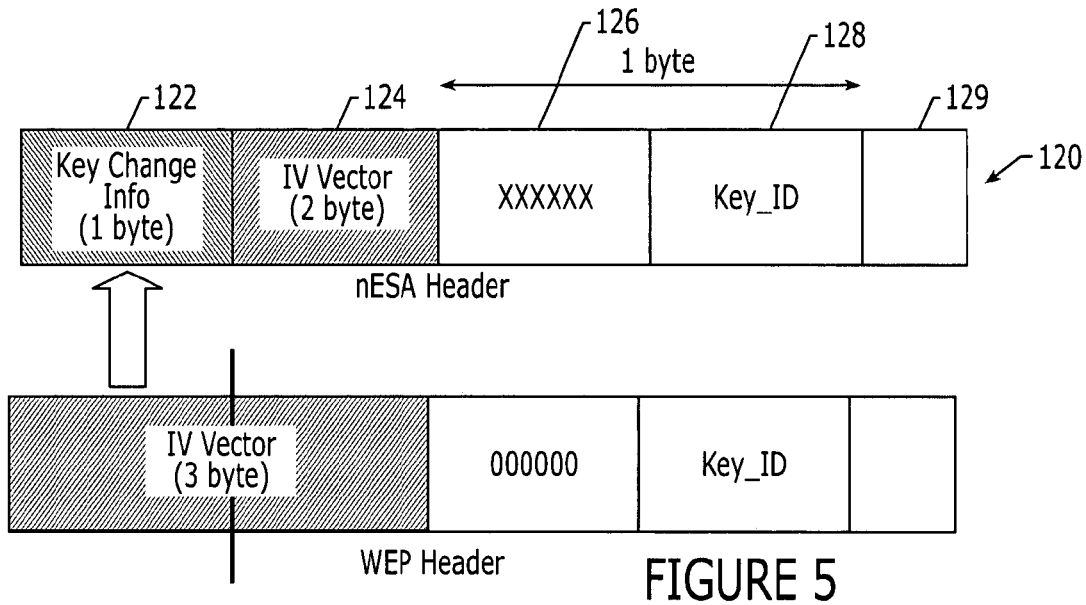

FIG. 5 is an example of header format for the encryption algorithm of the present invention as distinguished from the header format of the WEP algorithm, in accordance with an embodiment of the present invention.

Figure 6:
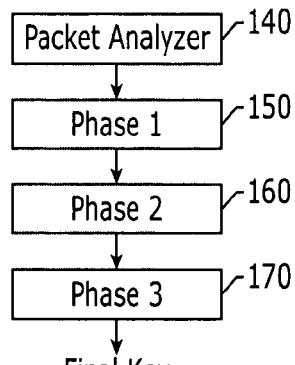

FIG. 6 is a simplified flow diagram of the processing steps of the encryption algorithm of the present invention, in accordance with an embodiment of the present invention.

Figure 7:
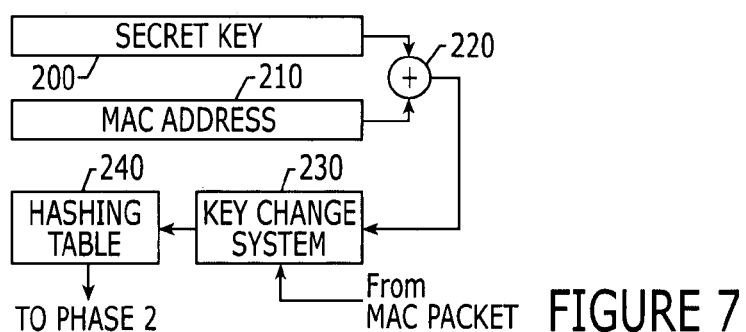

FIG. 7 is a block diagram of the first phase of the encryption algorithm that results in generation of a first temporary key, in accordance with an embodiment of the present invention.

Figure 8:
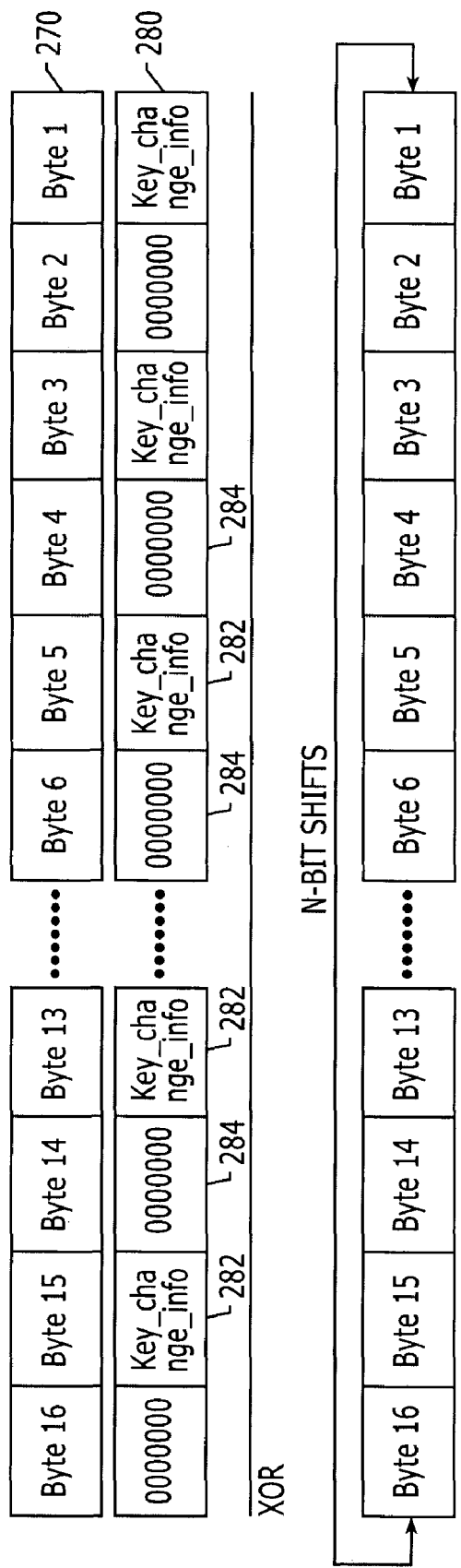

FIG. 8 is block diagram of the key change system or modification routine implemented within the first phase of the encryption algorithm, in accordance with an embodiment of the present invention.

Figure 9:
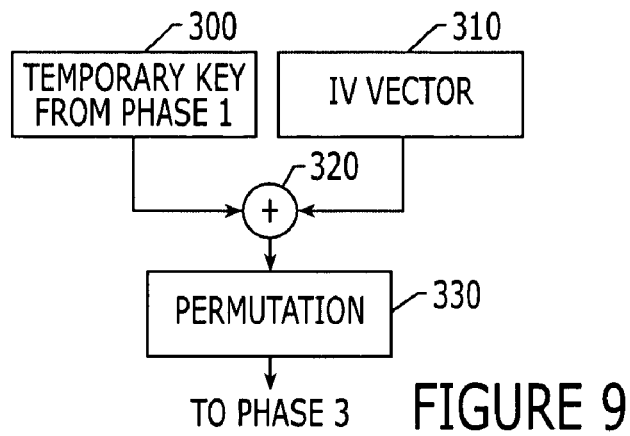

FIG. 9 is block diagram of the second phase of the encryption algorithm that results in generation of a second temporary key, in accordance with an embodiment of the present invention.

Figure 10:
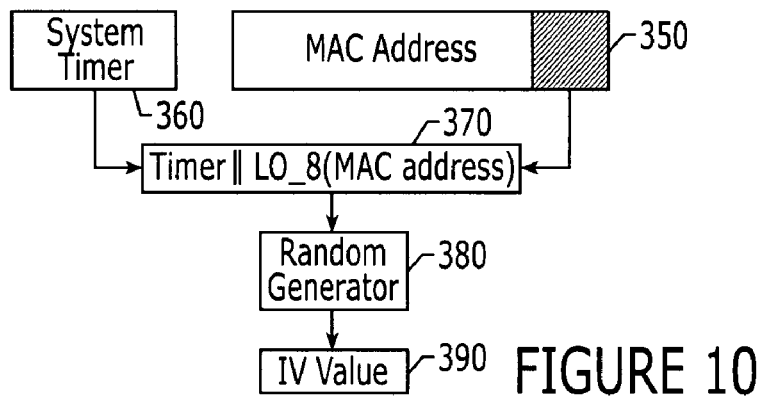

FIG. 10 is block diagram of the IV value generation routine within the second phase of the encryption algorithm, in accordance with an embodiment of the present invention.

Figure 11:
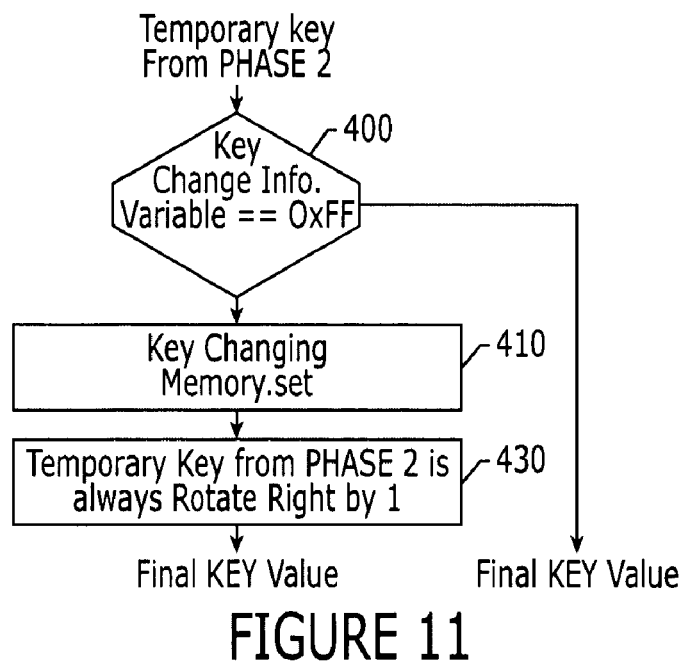

FIG. 11 is a flow diagram of the third phase of the encryption algorithm that results in the final key value, in accordance with an embodiment of the present invention.

Figure 12:
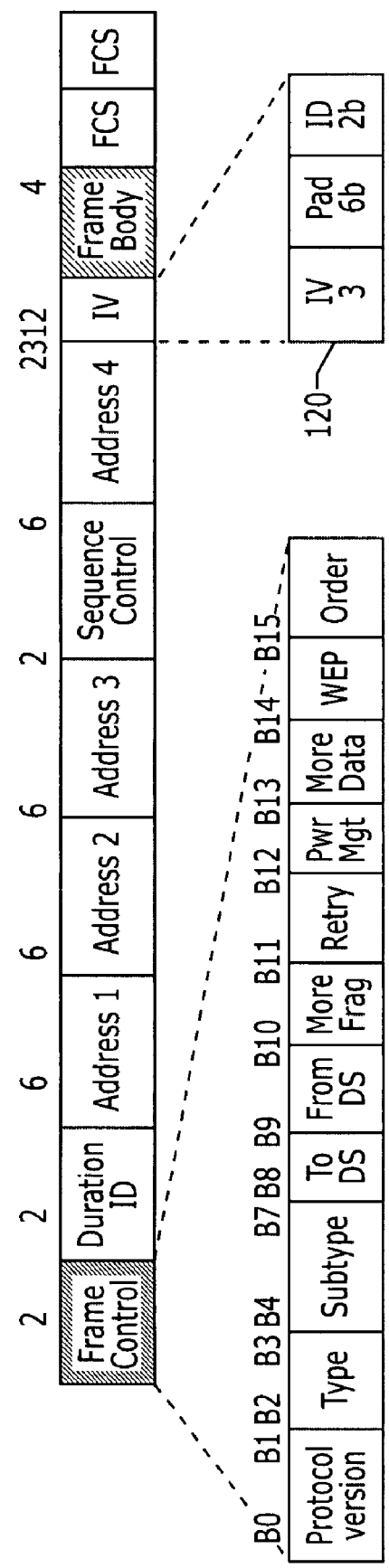

FIG. 12 is a block diagram of the entire structure of a current WLAN MAC packet.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with an embodiment of the present invention an improved encryption system and method, typically implemented in a Wireless Local Area Network (WLAN), generates random output values using a Pseudo Random Number Generator (PRNG) and benefits from a key scheduling algorithm that can change the final key value for every data packet that requires encryption. In addition, the improved encryption system and method of the present invention may have a wider final key value length than existing WEP algorithms and may change the shared secret key value on a regular or irregular basis. The algorithm of the present invention also generally provides for no cross correlation between the IV value and the final key value and, therefore, cracking the final key value is not made easier even if the initial IV value is set to zero. As such, the algorithm of the present invention provides heightened security to the transmission of encrypted data because decoding the final key value in the algorithm of the present invention is markedly more difficult than decoding the same in the known WEP algorithm.

FIG. 1 is a block diagram of the overall encryption/decryption architecture 10, in accordance with an embodiment of the present invention. The improved encryption/decryption system 20 of the present invention may reside external to the Medium Access Control (MAC) processor 30 (as shown in FIG. 1) or it may reside internally within the MAC processor. In the embodiment shown in FIG. 1, the improved encryption/decryption system resides external to the MAC processor, disposed between the MAC processor and the physical layer processor 40 and generally embodied by a field programmable gate array, an application specific integrated circuit or any of a wide variety of other processing elements that are either configured in hardware or designed to operate under appropriate software control in order to perform the various functions set forth below. As such, in one embodiment, the system and method of the present invention are embodied by a computer program product comprising memory or another program storage device that has been programmed with a series of computer instructions that cause the various functions described below to be performed once the program storage device is read or interpreted by a machine, such as a computer or other processing element, and the series of instructions are executed.

The novel encryption/decryption system includes a data packet analyzer 22 that analyzes data packets to determine if encryption/decryption is appropriate, an encryptor 24 that encrypts the data packets according to the three phase encryption process discussed at length below, an initialization vector generator 26 that generates an initialization vector and a decryptor 28 that uses a predefined secret key to decrypt messages coming from the physical layer of network. The encryption/decryption system 20 is in communication with a memory device 50 that stores relevant information, such as hash tables, timing values, MAC addresses, etc., that are implemented in the algorithms of the encryption system.

The encryption provided by the present invention may be utilized instead of or in addition to other encryption techniques. As shown in FIG. 1, for example, the MAC processor 30 will typically implement the WEP algorithm 32 to produce WEP encrypted packets 80 as shown FIG. 4. The WEP encrypted packets may then be further encrypted in accordance with the algorithm of the present invention to produce packets 90 as also shown in FIG. 4 prior to transmitting the packets, such as via the WLAN. As previously noted, the encryption system 20 of the present invention may exist external to the MAC processor or internally, within the MAC processor. The external configuration provides the benefit of not having to modify the MAC processor in order to implement the new encryption algorithm, while the internal configuration reduces chip count. In either configuration, the data packets will typically need to be analyzed during transmission between the MAC layer and the physical layer to determine if the data packets are to be encrypted or decrypted according to the present invention. FIGS. 2 and 3 provide for flow diagrams of the analysis processes for data packets transmitted from the MAC layer to the physical layer and from the physical layer to the MAC layer, respectively, in accordance with an embodiment of the present invention. The analysis processes typically occur within the data packet analyzer 22 of the improved encryption/decryption system 20 depicted in FIG. 1 and as shown in block 140 of FIG. 6.

Packets being transmitted, i.e., packets propagating from the MAC layer to the physical layer, may be encrypted according to the present invention. Referring to the flow diagram of FIG. 2, packets/frames being transmitted are received from the MAC layer and, at step 60, a frame type is determined. If the frame is determined to be a management control frame, then the frame does not undergo encryption processing and it is transmitted directly to the physical layer, stage 62. If the frame is determined to be a data frame then, at step 64, a subtype determination is made to assess the content in the payload section of the data frame. If the frame is determined to be empty, then the frame does not undergo encryption processing and it is transmitted directly to the physical layer, stage 62. If the frame is determined to include existing data then, at step 66, a determination is made as to whether the WEP algorithm, typically implemented in the MAC layer, has been applied to the frame so as to WEP encrypt the frame. This is determined by assessing the WEP bit in the packet header (shown as B14 in the frame control of FIG. 12). If the WEP algorithm has not been applied, then the frame does not undergo encryption processing and it is transmitted directly to the physical layer, stage 62. If the frame is determined to have been WEP encrypted then, at step 68, the packet subtype is changed to reflect the need to perform encryption in accordance with the present invention. The packet subtype is changed by setting the MSB (the Most Significant Bit) to a value of one, indicating that the encryption method of the present invention is to be performed. The data frame is then processed in accordance with the encryption algorithm of the present invention, stage 69.

Packets can also flow in the opposite direction, i.e., from the physical layer to the MAC layer, in which case, the packets may require decryption according to the present invention. Referring to the flow diagram of FIG. 3, frames flowing in the physical layer to MAC layer direction are received from the physical sublayer and, at step 70, a frame type is determined. If the frame is determined to be a management control frame, then the frame does not undergo decryption processing and it is transmitted directly to the MAC layer, stage 72. If the frame is determined to be a data frame then, at step 74, a subtype determination is made to assess the content in the payload section of the data frame. If the frame is determined to be empty, then the frame does not undergo decryption processing and it is transmitted directly to the MAC layer, stage 72. If the frame is determined to include existing data then, at step 76, a determination is made as to whether the WEP algorithm, typically implemented in the MAC layer, applies to this frame, i.e., it is determined if the frame has also been WEP encrypted. If the WEP algorithm does not apply to this frame, then the frame does not undergo decryption processing and it is transmitted directly to the MAC layer, stage 72. If the frame is determined to have been WEP encrypted then, at step 78, the packet subtype is changed to reflect the need to perform decryption in accordance with the present invention. The packet subtype is changed by setting the MSB (the Most Significant Bit) to a value of zero, indicating that the decryption method of the present invention is to be performed. Thereafter, the frame is decrypted in accordance with the present invention as described below and as shown in block 79 of FIG. 3. Following decryption in accordance with the present invention, the frame may still be WEP encrypted as shown by the transition from frame 100 to frame 110 of FIG. 4. As such, the frame may then be further decrypted in accordance with a conventional WEP decryption process to recover the original data.

FIG. 6 is a simplified flow diagram that illustrates the three-phase nature of the encryption algorithm of one advantageous embodiment of the present invention. While the system and method of the present invention will be described in terms of encryption, the system and method applies equally to decryption as will be apparent to those skilled in the art. Prior to beginning the encryption process, data packets are first analyzed, at step 140, as described above to determine the need for encryption. After the data packets have been analyzed the first phase of the encryption process ensues, at step 150. The first phase of the algorithm involves changing the selected shared secret key by implementing a bitwise exclusive OR (XOR) operation, a modification routine and a hashing routine to result in a first temporary key. After the first temporary key has been established the second phase commences, at step 160, with the second phase of the algorithm involving bitwise XORing of the first temporary key from phase one and an IV value. The result of the bitwise XOR process undergoes a permutation process resulting in generation of a second temporary key. After the second temporary key has been established the third phase of the algorithm is initiated, at step 170. The third stage of the algorithm involves modification of the second temporary key if a determination is made that the key changing information (described below) has been repeated, thereby indicating that a certain number of secret keys have been generated with the key changing information being modified in a predefined manner from key to key. A final key value results from either the modification or the determination that no modification is required. Each of these phases is described in much greater detail below.

FIG. 7 is a block diagram of the first phase of the encryption algorithm, in accordance with an embodiment of the present invention. At step 200, a shared secret key is selected, such as by selecting the shared secret key from one of four 128-bit shared secret keys as known to those skilled in the art. The selection of the shared secret key may be limited to one of the four shared secret keys as defined by the standard procedures for wireless systems. The standard procedures for wireless systems are addressed in standard specification IEEE (Institute of Electrical and Electronics Engineers) 802.11, which is well known by those of ordinary skill in the art. The network elements of the WLAN, such as the Network Interface Cards (NICs) and the remote Access Point (AP) devices will generally simultaneously obtain the same shared secret key by any standard communication routine, such as an 802.1x billing server, email or the like.

As a data packet is transmitted from the MAC layer to the physical layer that is determined by the analysis process of FIG. 2 to need encryption, at step 210, the MAC address of the transmitting device is obtained from the data packet. The shared secret key and the MAC address are then bitwise XORed, at step 220, with the result being a new secret key, also typically having 128 bits. XOR is a logical operation returning a 1 if two values compared are different and returning a 0 if they are the same. For example, used in bitwise operations 1 XOR 0 or 0 XOR 1 gives 1 and 1 XOR 1 or 0 XOR 0 gives 0. The use of bitwise XOR in encryption is well known by those of ordinary skill in the art. The bitwise XOR operation establishes the uniqueness of the secret key and each user's key becomes asynchronous, thus preventing exposure of the secret key to the would-be-attacker.

At step 230, the secret key undergoes a key change modification process using the shared secret key modification information, typically having 8 bits, obtained from the MAC header of the data packets. The modification process is shown in the upper portion of FIG. 8, which shows byte segmentation of the new secret key 170, shown to have 16 bytes in the illustrated embodiment, that resulted from the bitwise XOR at step 220. During the key change modification step 230 alternating bytes of the secret key 270 are XORed with the modification information 280. In this regard, the modification information comprises alternating bytes of 8-bit key change information 282 obtained from the MAC header (each byte of key change information 282 being identical) and 8-bit strings of zeros 284.

The modification process of the first phase of the present invention creates larger space in which to generate the shared secret key. Since the shared secret key is static, an identical secret key can be generated when an identical Initialization Vector (IV) value is used. For this reason, wider space for secret key generation is advantageous. From the key generation space that results from the modification process of the first phase, each user can obtain 256 different secret keys from a single initial secret key 200 as a result of the 256 different values of the 8 bit key change information of the illustrated embodiment.

Returning to FIG. 7, after the modification process is completed the first phase of the encryption algorithm performs a hashing operation at step 240. The hashing operation is conducted using a conventional hash table comprised of asynchronous non-linear values, such as S-Box. The S-Box hash table is well known by those of ordinary skill in the art, although other hash functions can be employed if desired. The result of the hashing operation is a first temporary key.

FIG. 9 is a block diagram of the second phase of the encryption algorithm, in accordance with an embodiment of the present invention. At step 300, the first temporary key from the first phase of the encryption algorithm is obtained. At step 310, the second phase of the encryption algorithm obtains an IV value.

FIG. 10 is a block diagram of the method for IV value generation, in accordance with an embodiment of the present invention. At step 350, a portion of the MAC address of the transmitting device, such as the least significant 8 bits of the MAC address, is extracted. At step 360, a random time value is captured from the system timer and at step 370 the timer value and the least significant 8 bits of the MAC address are concatenated to form a seed. This seed is then input, at step 380, into a random number generator algorithm, which in turn generates the IV value, at step 390. The random number generator algorithm is a standard random number generating algorithm using conventional transformation or rejection methods. Advantageously, it has been found that generating the IV value in accordance with the foregoing method provides for convenient key management, thereby overcoming one drawback of the WEP algorithm.

Referring again to the second phase block diagram of FIG. 9, at step 320 a bitwise XOR operation is performed on the first temporary key from phase one and the IV value. The result of the bitwise XOR then undergoes, at step 330, permutation processing. In one embodiment of the invention, permutation processing involves two separate processes. First, an exchange between the upper 8 bits and the lower 8 bits in the 16-bit IV value is undertaken to provide for a wider range of keys. Second, the 128-bit key that results from the bitwise XOR operation and the exchange of upper and lower bits becomes the address of the Substitution Box (S-Box) and its value is outputted. This output is then rotated by shifting right by 1 bit, resulting in the output of the permutation process, referred to herein as a second temporary key.

FIG. 11 is a flow diagram of the third phase of the encryption algorithm, in accordance with an embodiment of the present invention. In the third phase of the encryption algorithm, further modification of the secret key is performed if it is determined that the key changing information is repeated. When the key generation space is exhausted due to the 8-bit size of the key changing information, the key changing information repeats. At step 400, a key change information variable is analyzed to determine if the key changing information is repeated. The key change information serves as a counter that is incremented by 1 for each different secret key that is generated and is then reset to 0 once the key changing information repeats. As a result of the key change information having 8 bits in the illustrated embodiment, repetition of the key change information is determined by checking the key change information value to see if it equals 0×FF, thereby indicating that 256 secret keys have been generated without having the key change information repeat. If it is determined in step 400 that the key change information has repeated by the key change information value equaling 0×FF, then modification of the secret key is required by shifting or rotating the secret key to the right by one bit as shown in the lower portion of FIG. 8 and in step 430. The key change information value is incremented by one. The secret key that results from the rotation to the right is deemed the final key value, which is used to encrypt a data packet. In contrast, if a determination is made that the key change information has repeated as indicated by the key change information value being some value less than 0×FF, then the second temporary key is considered the final key value. In this case, the key change information value is also set to zero to start the process over. In either instance, the final key value is used as the "seed" for the Pseudo Random Number Generator (PRNG), which performs the encryption algorithm.

As shown in FIG. 5 and, in more detail, in FIG. 12, the encryption algorithm of the present invention is preferably implemented without altering the existing packet structure. In this regard, FIG. 12 depicts a typical packet structure. In order to provide the receiving device with the necessary information to decrypt the packet, however, a header 120, having four bytes in the illustrated embodiment, is provided. As shown, this header includes the key change information 122 (1 byte) and the IV vector 124 (2 bytes) that were utilized to encrypt the data. In addition, the header includes the key ID 128 (2 bits), which identifies which one of the four 128-bit shared secret keys, was initially selected as known to those skilled in the art. In order to have the same size (4 bytes) as a conventional WEP header as shown in FIG. 5, a six-bit pad 126 is included with the value of the six-bit pad being irrelevant. As will be apparent to those skilled in the art, this header is transmitted without encryption and precedes the encrypted payload 129 so as to enable the receiving device to decrypt the payload. As indicated in FIG. 4, an Integrity Check Value (ICV) may be appended to the packet, as known to those skilled in the art.

Therefore, the present invention provides for a novel encryption system and method that may encrypt all of the transmitted and received data packets on the data link layer without collisions on the Initialization Vector (IV). In the encryption system and method of the present invention a new final key value is generated and may be applied to every transmitted and received data packet. As described above, the encryption system and method entail a three phase algorithmic process for generating a final secret key that is much more difficult to crack than conventional encryption techniques, such as WEP encryption.

In addition the encryption system and method of the present invention provide for the same level of encryption if it is either included within the MAC processor or when it exists in an independent module. The system can increase overall encryption efficiency relative to pre-existing encryption systems, such as Wired Equivalent Privacy (WEP) encryption, without the need to alter the data packet header. Additionally, the system and method can be used in both wired LANs and in wireless LANs due to its flexibility in the data packet switch networks.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for generating a temporary key for data encryption in a communication network, the method comprising the steps of:

generating an Initialization Vector (IV) value;

combining a first secret key with the IV value by performing a bitwise exclusive OR (XOR) operation to result in an intermediate value; and permutating the intermediate value by exchanging a selected number of bits of the IV value with an equal number of other bits of the IV value and outputting a result of the bitwise XOR operation and the exchange of the bits as a value that is bit shifted.

2. The method of claim 1, further comprising computing the first secret key by selecting a predefined secret key, combining the predefined secret key with a user-specific Medium Access Control (MAC) address to result in the intermediate value, combining the intermediate value with predefined key change information and transforming the combination of the intermediate value and the predefined key change information by hashing to result in the first secret key.

3. The method of claim 2, wherein computing the first secret key further comprises selecting one of several predefined secret keys.

4. The method of claim 2 further comprising obtaining the predefined key change information from a MAC data packet.

5. The method of claim 2, wherein combining the intermediate value with the predefined key change information further comprises performing a bitwise XOR operation.

6. The method of claim 1, wherein generating an Initialization Vector (IV) value further comprises the steps of:
concatenating a timer value and at least a portion of a MAC address to result in a seed value; and
applying the seed value to a random number generator to result in the IV value.

7. A method for generating a key for data encryption in a communication network, the method comprising the steps of:
calculating a first secret key utilizing predefined key change information;
determining if the key change information has repeated; and
differently processing the first secret key to generate the key for data encryption in instances in which the key change information has repeated than in instances in which the key change information has not repeated,
wherein differently processing the first secret key comprises performing a bitwise shift of the first secret key in instances in which the key change information has repeated.

8. The method of claim 7 wherein calculating a first secret key further comprises the steps of selecting a predefined secret key, combining the predefined secret key with a user-specific Medium Access Control (MAC) address to result in a first intermediate value, combining the first intermediate value with predefined key change information, transforming the combination of the intermediate value and the predefined key change information by hashing to result in a temporary key, combining the temporary key and an IV value and permutating the combination of the temporary key and the IV value to result in the first secret key.

9. A method for generating a key for data encryption in a communication network, the method comprising the steps of:
selecting a first secret key;
generating a first temporary key based upon a combination of the first secret key with at least a portion of a user-specific Medium Access Control (MAC) address and further based upon predefined key change information and hashing;
generating a second temporary key based upon a combination of the first temporary key and an Initialization Vector (IV) value;
determining if the predefined key change information has repeated; and
generating the key for data encryption based upon the second temporary key and the determination if the predefined key change information has repeated,
wherein generating the key for data encryption comprises differently processing the second temporary key to generate the key for data encryption in instances in which the key change information has repeated than in instances in which the key change information has not repeated.

10. A method according to claim 9 wherein differently processing the second temporary key comprises performing a bitwise shift of the second temporary key in instances in which the key change information has repeated.

11. The method of claim 9, wherein generating the first temporary key further comprises combining an intermediate value generated by the combination of the first secret key with at least a portion of the user-specific MAC address with the predefined key change information and thereafter transforming the combination of the intermediate value and the predefined key change information by hashing to generate the first temporary key.

12. The method of claim 11 wherein transforming comprises hashing the combination of the intermediate value and the predefined key change information to generate the first temporary key.

13. The method of claim 9, wherein generating the second temporary key comprises permutating the combination of the first temporary key and the IV value.

14. The method of claim 9, wherein generating the second temporary key comprises generating the IV value by concatenating a timer value and at least a portion of a MAC address to result in a seed value and applying the seed value to a random number generator to result in the IV value.

15. A method for data encryption in a communication network, the method comprising the steps of:
generating a first temporary key based upon a combination of a first secret key with at least a portion of a user-specific Medium Access Control (MAC) address and further based upon predefined key change information and hashing;
generating a second temporary key based upon a combination of the first temporary key and an Initialization Vector (IV) value;
determining if the predefined key change information has repeated;
generating a final key based upon the second temporary key and the determination if the predefined key change information has repeated;
encrypting data transmitted via the communication network with the final key;
determining if the data is originally encrypted in accordance with a predetermined encryption technique; and
decrypting the data if the data is originally encrypted in accordance with the predetermined encryption technique, prior to encrypting the data transmitted via the communication network with the final key.

16. A method according to claim 15 wherein determining if the data is originally encrypted comprises determining if the data is originally encrypted in accordance with a WEP technique.

17. A computer program product readable by a machine and tangibly embodying a program of instructions executable by the machine to perform steps for data encryption, the program of instructions comprising the steps of:
generating a first temporary key based upon a combination of a first secret key with at least a portion of a user-specific Medium Access Control (MAC) address and further based upon predefined key change information and hashing;
generating a second temporary key based upon a combination of the first temporary key and an Initialization Vector (IV) value;
determining if the predefined key change information has repeated;
generating a final key based upon the second temporary key and the determination if the predefined key change information has repeated, wherein generating the key for data encryption comprises differently processing the second temporary key to generate the key for data encryption in instances in which the key change information has repeated than in instances in which the key change information has not repeated; and encrypting data transmitted via the communication network with the final key.

18. The computer program product of claim 17 wherein the program of instructions further comprises the steps of:
determining if the data is originally encrypted in accordance with a predetermined encryption technique; and
decrypting the data if the data is originally encrypted in accordance with the predetermined encryption technique, prior to encrypting the data transmitted via the communication network with the final key.

19. The computer program product of claim 17 wherein the step of differently processing the second temporary key comprises performing a bitwise shift of the second temporary key in instances in which the key change information has repeated.

20. The computer program product of claim 17 wherein the step of generating the first temporary key further comprises combining an intermediate value generated by the combination of the first secret key with at least a portion of the user-specific MAC address with the predefined key change information and thereafter transforming the combination of the intermediate value and the predefined key change information to generate the first temporary key.

21. The computer program product of claim 20 wherein transforming comprises hashing the combination of the intermediate value and the predefined key change information to generate the first temporary key.

22. The computer program product of claim 17, wherein the step of generating the second temporary key comprises permutating the combination of the first temporary key and the IV value.

23. The computer program product of claim 17, wherein the step of generating the second temporary key comprises generating the IV value by concatenating a timer value and at least a portion of a MAC address to result in a seed value and applying the seed value to a random number generator to result in the IV value.

* * * * *